UNITED STATES PATENT OFFICE.

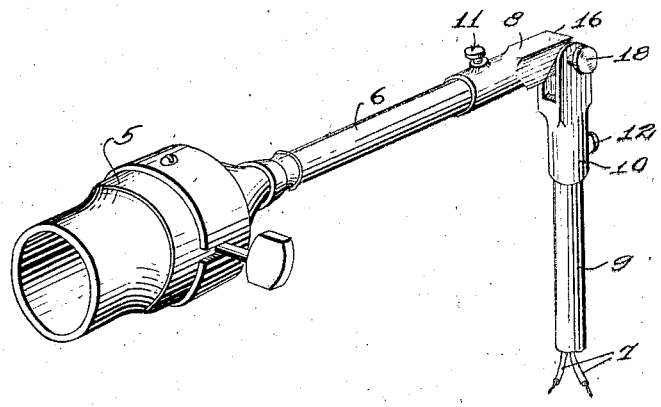
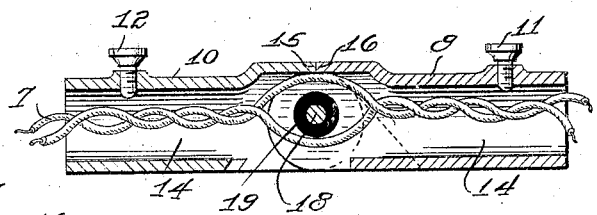
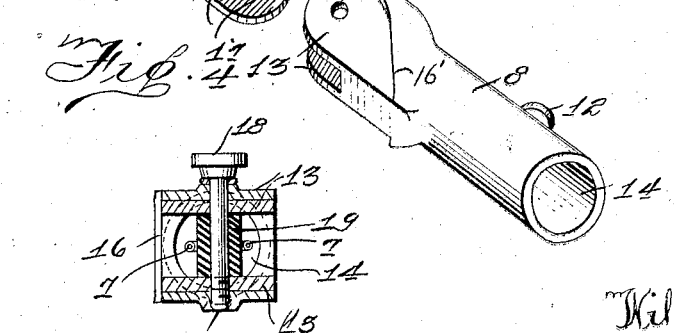

WILLIAM H. EISENHART, OF YORK, PENNSYLVANIA.

ELECTRIC-LIGHT SHIFTER.

1,167,891.           Specification of Letters Patent.      Patented Jan. 11, 1916.

Application filed November 12, 1914. Serial No. 871,782.

*To all whom it may concern:*

Be it known that I, WILLIAM H. EISENHART, a citizen of the United States, residing at York, in the county of York and State of Pennsylvania, have invented certain new and useful Improvements in Electric-Light Shifters, of which the following is a specification.

This invention relates to electric light shifters and more particularly to a bracket for supporting an electric light and which will facilitate the shifting of the light to any desired position.

The primary object of the invention is the provision of an electric light bracket which can be employed in connection with any electric light fixture and which will provide easy and quick shifting of the light from one position to another.

Another object of the invention is to provide an electric light bracket which may be adjusted as often as desired without fear of a short circuit in the electric current at the joint.

Another object of the invention is the provision of a device of this kind which may be used in plurality and will be universal in scope of movement.

With these and other objects in view the invention resides in the novel construction and application which will be hereinafter set forth in the specification and pointed out in the claims.

Figure 1 is a perspective view of the lamp bracket showing an electric light socket attached thereto; Fig. 2 is a vertical longitudinal section through the bracket joint; Fig. 3 is a perspective view showing both sections of the bracket joint; Fig. 4 is a vertical transverse section through the swivel pin of the bracket joint.

Like characters of reference denote corresponding parts throughout the several views of the drawing.

An electric lamp socket 5 is secured to the tubular arm 6 which provides a conduit for the electric wires 7. The tubular arm 6 is attached to the pivoted joint member 8. A tubular arm 9 is secured in any preferred manner to an electric wall fixture (not shown) to which the electric wires 7 are connected. The tubular arm 9 is secured to the pivot joint member 10. Any desired means for securing the tubular arms 6 and 9 to the joint members 8 and 10 are employed which in this instance is shown as set screws 11 and 12.

The joint members 8 and 10 are each provided with flanges 13. These flanges 13 are spaced apart to provide a space between each pair and this space is in open communication with the longitudinal passages 14 formed in each of the joint members 8 and 10. A shoulder 15 is provided on the member 10 and a similar shoulder 16 is provided on the member 8. These shoulders extend across one side of each of the joint members and form stops for holding the joint members in longitudinal alinement. Diagonal shoulders 16' are arranged on the outer sides of the flanges of the member 8 for limiting the outward swinging movement of the other member by contacting with the sides of the flanges thereof. Openings 17 are provided in each of the flanges 13 for the reception of a pivot pin 18. The flange 13 through which the threaded end of the pivot pin projects is provided with threads for the tightening of the joint after the light is swung to any desired position. In order that a short circuit may not occur in the wires at the joint, due to the wearing of the wire insulation, I provide a sleeve of insulating material 19 which is mounted on the pivot pin 18 and extends entirely across the passage between the flanges. Thus it will be seen that the constant shifting of the light from one position to another which might damage the insulation at this point will not cause a short circuit because of the insulated sleeve which separates the two strands of circuit wire as shown in Fig. 2. It is evident that a very simple electric light bracket is provided and that two or more of these pivoted joints may be used in actual practice so that a universal movement of the light can be obtained.

I claim:

1. An electric light bracket including a pair of hollow arms, hollow joint members associated with the arms, means for removably holding the members in engagement with the arms, an insulated adjusting pin for pivotally connecting the joint members together, transverse shoulders on one side of each of the joint members constituting stops for holding the members in longitudinal alinement, and diagonal shoulders on one of the members for limiting the swinging movement of the other member.

2. An electric light bracket including a pair of hollow arms, joint members telescopically associated with the adjacent ends of the arms, set screws associated with the joint members for removably holding them in position on the arms, spaced flanges formed on the adjacent ends of the joint members and arranged in complementary pairs to provide a space therebetween, a screw-threaded pin associated with the flanges for pivotally and adjustably connecting the joint members, transverse shoulders on one of the sides of each of the members constituting stops for holding the members in longitudinal alinement, and diagonal shoulders on one of the members for limiting the swinging movement of the other member.

In testimony whereof I affix my signature in presence of two witnesses.

WILLIAM H. EISENHART.

Witnesses:
  Edward J. Loucks,
  Caroline Eisenhart.